(12) United States Patent
Horowitz et al.

(10) Patent No.: US 12,400,242 B1
(45) Date of Patent: Aug. 26, 2025

(54) SYSTEM, METHOD, AND COMPUTER PROGRAM PRODUCT FOR LOCATION-BASED BENEFITS FOR E-COMMERCE TRANSACTIONS

(71) Applicant: B & H Foto & Electronics Corp., New York, NY (US)

(72) Inventors: Menashe Horowitz, New York, NY (US); Yosef Kind, New York, NY (US); Moshe E. Hill, New York, NY (US); Eli Herz, New York, NY (US); Joel Kornbluh, New York, NY (US); Joseph Herskovits, New York, NY (US)

(73) Assignee: B & H Foto & Electronics Corp., New York, NY (US)

( * ) Notice: Subject to any disclaimer, the term of this patent is extended or adjusted under 35 U.S.C. 154(b) by 0 days.

(21) Appl. No.: 16/688,070

(22) Filed: Nov. 19, 2019

Related U.S. Application Data (60) Provisional application No. 62/769,036, filed on Nov. 19, 2018.

(51) Int. Cl.
   *G06Q 30/04* (2012.01)
   *G06Q 20/32* (2012.01)
   (Continued)

(52) U.S. Cl.
   CPC ..... *G06Q 30/0222* (2013.01); *G06Q 20/3224* (2013.01); *G06Q 30/04* (2013.01); *G06Q 30/0635* (2013.01)

(58) Field of Classification Search
   CPC ............... G06Q 30/0222; G06Q 30/04; G06Q 30/0635; G06Q 20/3224
   See application file for complete search history.

(56) References Cited

U.S. PATENT DOCUMENTS

| | | | |
|---|---|---|---|
| 6,983,261 B1* | 1/2006 | Francisco | G06Q 20/20 235/382 |
| 8,478,653 B1* | 7/2013 | Conway | G06Q 30/04 705/26.1 |

(Continued)

FOREIGN PATENT DOCUMENTS

| | | | |
|---|---|---|---|
| WO | WO-2009145366 A1 * | 12/2009 | G06Q 30/02 |

OTHER PUBLICATIONS

Authors et. al.: Disclosed Without Attribution, "Method to perform a shared cashless transaction," 2018 The IP.com Journal (Year: 2018)*

*Primary Examiner* — Jessica Lemieux
*Assistant Examiner* — Rashida R Shorter
(74) *Attorney, Agent, or Firm* — The Webb Law Firm (57) ABSTRACT

Provided is a computer-implemented method for location-based benefits for e-commerce transactions. The method includes receiving a request for a purchase with a delivery destination from a user, determining, with at least one processor, a geophysical location of the delivery destination based on the request, determining, with at least one processor, a benefit based on an amount of state taxes corresponding to the purchase, the amount of state taxes based on the geophysical location of the delivery destination, adjusting, with at least one processor, the total transaction value of the purchase by decreasing the total transaction value by the benefit, and initiating an e-commerce transaction for the purchase based on the adjusted total transaction value. A system and computer-program product are also disclosed.

18 Claims, 5 Drawing Sheets

(51) Int. Cl.
*G06Q 30/0207* (2023.01)
*G06Q 30/0601* (2023.01)

(56) References Cited

U.S. PATENT DOCUMENTS

| | | | | |
|---|---|---|---|---|
| 8,583,495 | B2* | 11/2013 | Glatt | G06Q 30/00 |
| | | | | 705/40 |
| 2003/0126018 | A1* | 7/2003 | LaMotta | G06Q 20/207 |
| | | | | 705/31 |
| 2006/0235776 | A1* | 10/2006 | Temme | G06Q 40/00 |
| | | | | 705/31 |
| 2009/0240605 | A1* | 9/2009 | Rukonic | G06Q 20/10 |
| | | | | 705/30 |
| 2010/0169214 | A1* | 7/2010 | Nonni | G07G 1/0036 |
| | | | | 705/44 |
| 2011/0213678 | A1* | 9/2011 | Chorney | G06Q 30/0601 |
| | | | | 705/26.61 |
| 2013/0085913 | A1* | 4/2013 | Luongo | G06Q 40/123 |
| | | | | 705/31 |
| 2013/0185161 | A1* | 7/2013 | Letca | G06Q 30/0261 |
| | | | | 705/14.66 |
| 2013/0268345 | A1* | 10/2013 | Davidson | G06Q 30/0623 |
| | | | | 705/14.37 |
| 2015/0161599 | A1* | 6/2015 | Sass | G06Q 40/02 |
| | | | | 705/39 |
| 2015/0193757 | A1* | 7/2015 | Luongo | G06Q 20/202 |
| | | | | 705/19 |
| 2017/0262941 | A1* | 9/2017 | Sanbe | G06Q 20/209 |
| 2017/0278156 | A1* | 9/2017 | Parekh | G06Q 30/0607 |
| 2020/0090152 | A1* | 3/2020 | Kumar | G06Q 20/10 |

\* cited by examiner

Company Logo

Order No: 1234567890

Bill to: Example Customer
123 Street Avenue
City, State 12345

Send to: Example Customer
123 Street Avenue
City, State 12345

| Invoice Date | Customer Code | Order Date | Purchase Order Number | Shipping |
|---|---|---|---|---|
| DD/MM/YYYY | 123456 | DD/MM/YYYY | 567890 | Expedited |

| Qty Ord | Qty Ship | Item Description | Item Price | Amount |
|---|---|---|---|---|
| 1 | 1 | Item A | $200.00 | $200.00 |
| 1 | 1 | Item B | $300.00 | $300.00 |

| Payment Type | Card/Check Number | Amount |
|---|---|---|
| Payment D | 987654321 | $500.00 |
| Payment E |  | $35.00 |

| | |
|---|---|
| Sub-Total: | $500.00 |
| Tax: | $35.00 |
| Total Order: | $535.00 |
| Balance: | $0.00 |

FIG. 4

Company Logo

Order No: 1234567890

Bill to: Example Customer
123 Street Avenue
City, State 12345

Send to: Example Customer
123 Street Avenue
City, State 12345

| Invoice Date | Customer Code | Order Date | Purchase Order Number | Shipping |
|---|---|---|---|---|
| DD/MM/YYYY | 123456 | DD/MM/YYYY | 567890 | Expedited |

| Qty Ord | Qty Ship | Item Description | | Item Price | Amount |
|---|---|---|---|---|---|
| 1 | 1 | Item A | | $200.00 | $200.00 |
| 1 | 1 | Item B | | $300.00 | $300.00 |

| Payment Type | Card/Check Number | Amount | | |
|---|---|---|---|---|
| Payment C | 123456789 | $47.00 | Sub-Total: | $500.00 |
| Payment D | 987654321 | $300.00 | Tax: | $35.00 |
| Payment F | 098764321 | $100.00 | | |
| Payment G | 012345789 | $60.00 | Total Order: | $535.00 |
| Payment E | | $28.00 | Balance: | $0.00 |

FIG. 5

SYSTEM, METHOD, AND COMPUTER PROGRAM PRODUCT FOR LOCATION-BASED BENEFITS FOR E-COMMERCE TRANSACTIONS

CROSS-REFERENCE TO RELATED APPLICATIONS

This application claims priority to U.S. Provisional Application No. 62/769,036 filed Nov. 19, 2018, entitled "System, Method, and Computer Program Product for Location-Based Benefits for E-Commerce Transactions," the content of which is incorporated by reference herein in its entirety.

BACKGROUND

Field

This invention relates generally to e-commerce transactions, in particular, utilizing location-based benefits for e-commerce transactions.

Technical Considerations

The addition of state taxes, including sales tax, being applied to e-commerce purchases provides a new source of expenses that are applied to e-commerce purchases. E-commerce retailers operate in various jurisdictions throughout the country which have many disparate state tax rates. Large volumes of purchases make it inefficient to consider the state taxes for each purchase individually. By being able to provide a financial benefit on a purchase in real time based on the location of the transaction, it is possible to save on sales processing time. By providing a financial benefit before the purchase is made, it also allows for the purchase to be completed with one transaction instead of utilizing a second transaction to reimburse the purchaser for the benefit after the purchase is made.

SUMMARY

Provided is a system, method, and computer program product for location-based benefits for e-commerce transactions that overcomes some or all of the deficiencies of the prior art.

According to a non-limiting embodiment of the present invention, provided is a computer-implemented method for location-based benefits for e-commerce transactions, including: receiving a request for a purchase with a delivery destination from a user; determining, with at least one processor, a geophysical location of the delivery destination based on the request; determining, with at least one processor, a total transaction value based on a purchase price and an amount of state taxes corresponding to the purchase based on the geophysical location of the delivery destination; determining, with at least one processor, a benefit based on an amount of state taxes corresponding to the total transaction value; adjusting, with at least one processor, the total transaction value by decreasing the total transaction value by the benefit; and initiating an e-commerce transaction for the purchase based on the adjusted total transaction value.

In non-limiting embodiments, initiating the e-commerce transaction for the purchase based on the adjusted total transaction value for the computer-implemented method comprises initiating a first transaction for the adjusted total transaction value with a first account and initiating a second transaction for a value of the benefit with a second account. In non-limiting embodiments, the first account corresponds to an account of the user and the second account corresponds to a benefit account. In non-limiting embodiments, initiating the first transaction comprises communicating a payment request for the adjusted total transaction value to a payment processing system and initiating the second transaction comprises allocating the value of the benefit from the benefit account to a primary merchant account.

In non-limiting embodiments, determining the benefit for the computer-implemented method further comprises determining, with at least one processor, a benefit factor on the geophysical location and a benefit database and generating the benefit by rounding the amount of state taxes up to the nearest multiple of the benefit factor. In non-limiting embodiments, the amount of state taxes is an exact multiple of the benefit factor, the benefit is generated by adding the benefit factor to the amount of state taxes. In non-limiting embodiments, adding the benefit factor only occurs for purchases in which the geophysical location of the delivery is in certain predetermined locations. In non-limiting embodiments, the amount of state taxes is rounded down to the nearest multiple of the benefit factor.

In non-limiting embodiments, the eligibility of a benefit for the computer-implemented method is based on a payment method used to make the purchase. In non-limiting embodiments, the geophysical location is determined based on the zip code used in the delivery address of the purchase.

According to another preferred and non-limiting embodiment, provided is a computer program product for location-based benefits for e-commerce transactions, including at least one computer-readable medium including program instructions that, when executed by at least one processor, cause the at least one processor to: receive a request for a purchase with a delivery destination from a user; determine a geophysical location of the delivery destination based on the request; determine a total transaction value based on a purchase price and an amount of state taxes corresponding to the purchase based on the geophysical location of the delivery destination; determine a benefit based on an amount of state taxes corresponding to the total transaction value, the amount of state taxes based on the geophysical location of the delivery destination; adjust the total transaction value by decreasing the total transaction value by the benefit amount; and initiate an e-commerce transaction for the purchase based on the adjusted total transaction value.

In non-limiting embodiments, initiating the e-commerce transaction for the purchase based on the adjusted total transaction value for the computer program comprises initiating a first transaction for the adjusted total transaction value with a first account and initiating a second transaction for a value of the benefit with a second account. In non-limiting embodiments, the first account corresponds to an account of the user and the second account corresponds to a benefit account. In non-limiting embodiments, initiating the first transaction comprises communicating a payment request for the adjusted total transaction value to a payment processing system and initiating the second transaction comprises allocating the value of the benefit from the benefit account to a primary merchant account.

In non-limiting embodiments, determining the benefit for the computer program further comprises determining, with at least one processor, a benefit factor on the geophysical location and a benefit database and generating the benefit by rounding the amount of state taxes up to the nearest multiple of the benefit factor. In non-limiting embodiments, the amount of state taxes is an exact multiple of the benefit factor, the benefit is generated by adding the benefit factor to the amount of state taxes. In non-limiting embodiments, adding the benefit factor only occurs for purchases in which the geophysical location of the delivery is in certain predetermined locations. In non-limiting embodiments, the amount of state taxes is rounded down to the nearest multiple of the benefit factor.

In non-limiting embodiments, the eligibility of a benefit for the computer program is based on a payment method used to make the purchase. In non-limiting embodiments, the geophysical location is determined based on the zip code used in the delivery address of the purchase.

According to a further preferred and non-limiting embodiment, provided is a system for location-based benefits for e-commerce transactions, including at least one computer including at least one processor, the at least one computer programmed or configured to: receive a request for a purchase with a delivery destination from a user; determine a geophysical location of the delivery destination based on the request; determining, with at least one processor, a total transaction value based on a purchase price and an amount of state taxes corresponding to the purchase based on the geophysical location of the delivery destination; determine a benefit based on an amount of state taxes corresponding to the total transaction value, the amount of state taxes based on the geophysical location of the delivery destination; adjust the total transaction value by decreasing the total transaction value by the benefit amount; and initiate an e-commerce transaction for the purchase based on the adjusted total transaction value.

According to a further preferred and non-limiting embodiment, provided is a computer-implemented method for location-based benefits for e-commerce transactions, including receiving, by a merchant, a request for a purchase with a delivery destination from a user; determining, with at least one processor, a geophysical location of the delivery destination based on the request; determining, with at least one processor, a total transaction value based on a purchase price and an amount of state taxes corresponding to the purchase based on the geophysical location of the delivery destination; determining, with at least one processor, a benefit based on the amount of state taxes corresponding to the purchase; adjusting, with at least one processor, the total transaction value by decreasing the total transaction value by a value of the benefit, resulted in an adjusted transaction value; initiating a first transaction for the adjusted transaction value with a first account corresponding to a payment account of the user; and initiating a second transaction for a value of the benefit with a second account corresponding to a benefit account of the merchant.

According to a further preferred and non-limiting embodiment, eligibility of a benefit may be determined based on the method of payment used by the user. In non-limiting embodiments, when multiple methods of payments are used by the user, the benefit will be based on the portion of the purchase price that is paid for by payment methods that are eligible for a benefit.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

BRIEF DESCRIPTION OF THE DRAWINGS

Additional advantages and details of the invention are explained in greater detail below with reference to the exemplary embodiments that are illustrated in the accompanying schematic figures, in which.

DESCRIPTION OF THE INVENTION

For purposes of the description hereinafter, the terms "end", "upper", "lower", "right", "left", "vertical", "horizontal", "top", "bottom", "lateral", "longitudinal" and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments or aspects of the invention. Hence, specific dimensions and other physical characteristics related to the embodiments or aspects disclosed herein are not to be considered as limiting.

As used herein, the terms "communication" and "communicate" refer to the receipt or transfer of one or more signals, messages, commands, or other type of data. For one unit (e.g., any device, system, or component thereof) to be in communication with another unit means that the one unit is able to directly or indirectly receive data from and/or transmit data to the other unit. This may refer to a direct or indirect connection that is wired and/or wireless in nature. Additionally, two units may be in communication with each other even though the data transmitted may be modified, processed, relayed, and/or routed between the first and second unit. For example, a first unit may be in communication with a second unit even though the first unit passively receives data and does not actively transmit data to the second unit. As another example, a first unit may be in communication with a second unit if an intermediary unit processes data from one unit and transmits processed data to the second unit. It will be appreciated that numerous other arrangements are possible.

Non-limiting embodiments of the present invention are directed to a method, system, and computer program product for location-based benefits for e-commerce transactions. Non-limiting embodiments of the invention allow for e-commerce companies to more efficiently adjust the total transaction value in real-time during a transaction, based on the location of the delivery destination, rather than doing so afterwards. Thus, the non-limiting embodiment of the invention allows e-commerce retailers to use less processing resources by avoiding the need to use separate transactions or subsequent processes to provide the user with the benefit.

Figure 1:
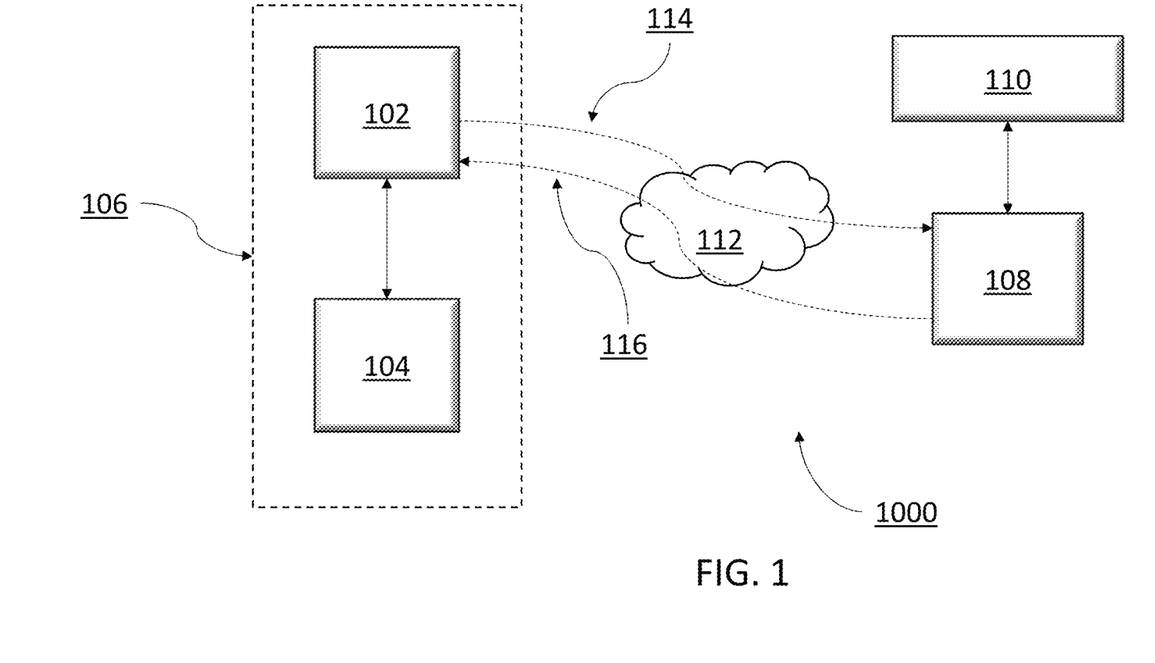
FIG. 1 is a schematic diagram for a system for location-based benefits for e-commerce transactions according to a non-limiting embodiment.

Referring to FIG. 1, a system 1000 for location-based benefits for e-commerce transactions is shown according to a preferred and non-limiting embodiment. An e-commerce server 102 may include one or more processors and, in some embodiments, may be operated by or on behalf of an e-commerce retailer. The e-commerce server 102 is in communication with a data storage device 104 including a state tax rate database, which may be local or remote to the e-commerce server 102. The e-commerce server 102 is also in communication with one or more customer devices 108 which may include one or more processors and which are operated by a user 110. The customer device 108 may include a computer or a mobile device. The customer device 108 accesses using a webpage, mobile application, or similar means to communicate a purchase request 114 to the e-commerce server 102. The purchase request 114 may identify one or more goods or services the customer wishes to purchase.

Still referring to FIG. 1, the e-commerce server 102, in response to the purchase request 114, communicates data 116 configured to present a graphical user interface (GUI) on the customer device 108 for completing an e-commerce transaction. In non-limiting embodiments, the e-commerce server 102, in response to the purchase request 114 and before communicating the data 116, determines a total transaction value, determines if the user and/or purchase is eligible for a benefit, and adjusts the total transaction value based on data received from the data storage device 104. The total transaction value may be determined based on adding a purchase price of each good or service, taxes applicable to the purchase (e.g., sales tax and/or any other taxes), and any shipping or handling costs. In the example shown in FIG. 1, the components of the system 1000 are in communication via a network environment 112, such as the internet, although it will be appreciated that communication may be facilitated over one or more public or private network environments and that various other arrangements are possible.

With continued reference to FIG. 1, the e-commerce server 102 and the data storage device 104 make up the e-commerce system 106, which handles the operations on the e-commerce company's side of the transaction. In non-limiting embodiments, the data storage device 104 may belong to a third party and may include other databases and data, such as a benefit factor database based on geophysical location, which can be utilized when determining the benefit. It will also be appreciated that different tax rates may apply to different products. Accordingly, adjustments may be individually determined based on each product identified in the purchase request 114.

Figure 2:
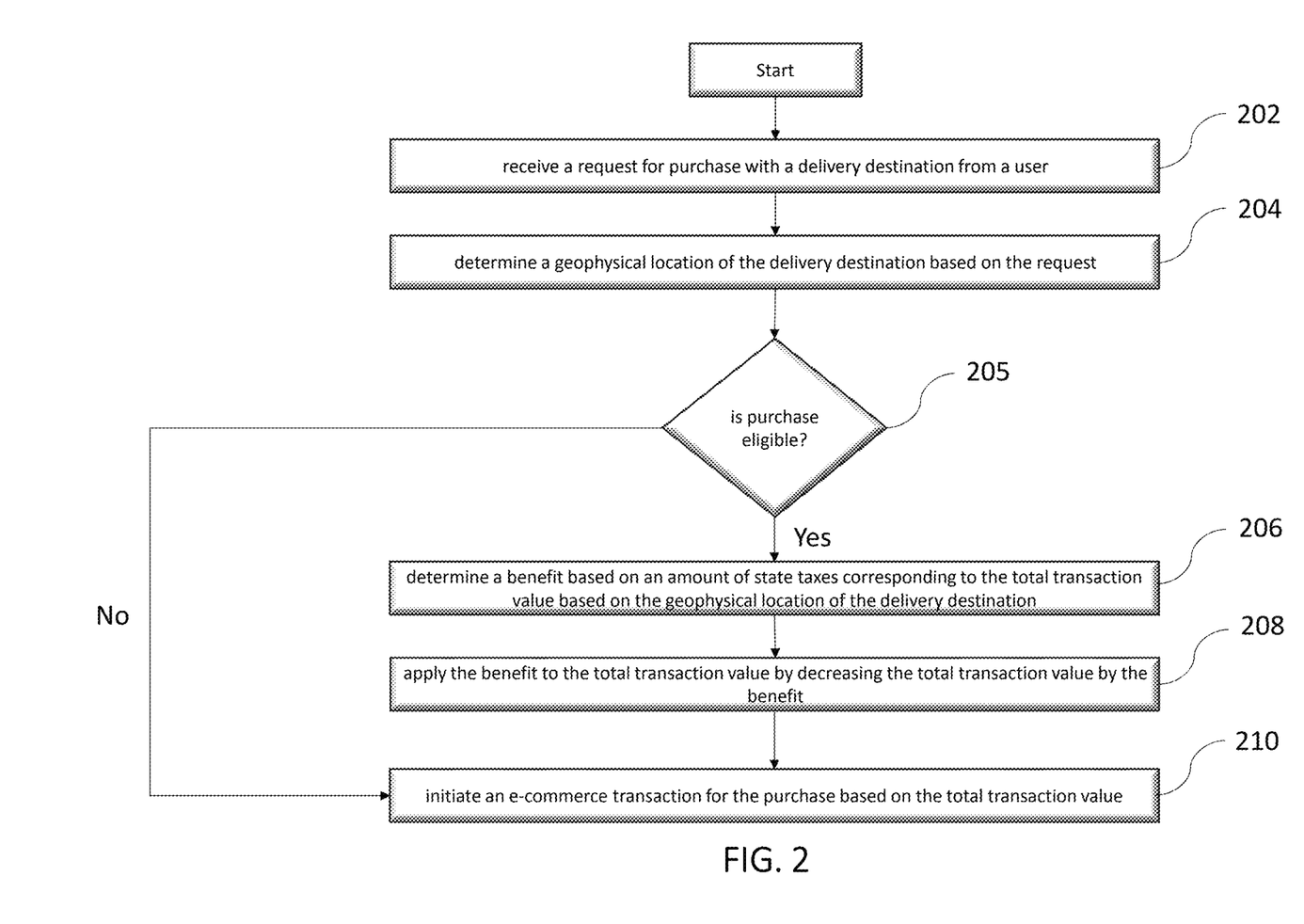
FIG. 2 is a flow diagram for a method of location-based benefits for e-commerce according to a non-limiting embodiment.

Referring now to FIG. 2, a flow diagram for a method of location-based benefits for e-commerce transactions is shown according to a preferred and non-limiting embodiment. It will be appreciated that fewer, more, or different steps may be used in different non-limiting embodiments. At step 202, a purchase request is received from a user for a purchase which includes a delivery destination and one or more goods and services each associated with a purchase price. At a next step 204, the delivery destination is used to determine the geophysical location of the delivery destination. In non-limiting embodiments, the purchase request may be initiated from a website shopping cart. The purchase request may also be received from submitting an online form, sending an email or text message, or any other like methods of communication. The geophysical location can be determined based on the zip code of the delivery address of the purchase.

With continued reference to FIG. 2, the geophysical location is then used in step 205 to determine if the purchase is eligible for a benefit. In non-limiting embodiments this may be done by comparing the geophysical location with a database of geophysical locations. In some non-limiting embodiments, one or more rules may also be applied to determine if the purchase and/or user are eligible, such as rules based on purchase amounts, methods of payment, number of payment methods used, purchase times, product types, subscription services of the user, and/or the like. If the geophysical location, purchase, and/or user is not eligible for a benefit, then the method skips to step 210 and an e-commerce transaction for the purchase is initiated without applying the benefit to the total transaction value. If the geophysical location, purchase, and/or user is eligible for a benefit, then at step 206, a benefit is determined based on an amount of state taxes corresponding to the total transaction value based on the geophysical location. This can be accomplished by utilizing a database of state taxes based on geophysical locations. In non-limiting embodiments, the database belongs to a third-party and is queried by the e-commerce server. Moreover, the benefit may differ depending on the state, geophysical location within a state, the purchase, the user, or any other parameter.

In non-limiting embodiments, if a rule based on a method of payment is used to determine eligibility of a benefit in step 205, this may include comparing the method of payment with a database of eligible payment methods. In non-limiting embodiments, when multiple methods of payment are used to make a purchase, eligibility may be determined for each method of payment. Each payment method may be used to pay for a portion of the purchase price. The amount of state taxes associated with each eligible method of payment is determined based on the portion of the purchase price that each eligible payment method will be used to pay. The benefit may be calculated for each eligible method of payment. The total benefit may be calculated as the sum of each benefit calculated for each eligible method of payment.

With continued reference to FIG. 2, in non-limiting embodiments, the benefit is determined based on a benefit factor. The benefit factor may be determined based on the geophysical location using a benefit factor database, which may be a separate database or the same database used to determine if a benefit is available. The benefit is calculated by rounding the amount of state taxes (in this example, state sales taxes) up to the nearest multiple of the benefit factor. In some non-limiting embodiments, when the amount of state taxes is a multiple of the benefit factor, the benefit is calculated by adding the benefit factor to the amount of state taxes. The addition of the benefit factor to the amount of state taxes can be, in some non-limiting embodiments, restricted to only certain geophysical locations. In some non-limiting embodiments, the amount of state taxes is rounded down to the nearest multiple of the benefit factor. In some non-limiting embodiments, the benefit factor has two digits after the decimal point. In some non-limiting embodiments, the benefit factor may be based on the payment method used to make the purchase. It will be appreciated that various other factors may be used and that different parameters may affect and be used to generate the benefit factor.

With continued reference to FIG. 2, in step 208, the total transaction value is adjusted by decreasing the total transaction value by the benefit. In step 210, the e-commerce transaction for the purchase is initiated based on the adjusted total transaction value. The user is therefore able to make the purchase utilizing the adjusted total transaction value, resulting in a single transaction for the user's method of purchase and showing up as a single entry on his or her credit card statement. This results in no additional transactions being necessary for the user's method of payment to process another transaction to give the user the benefit.

In non-limiting embodiments, initiating an e-commerce transaction in step 210 may include initiating two separate transactions. The first transaction may be for the adjusted transaction value and may be conducted with a first account. In non-limiting embodiments, the first account corresponds to a payment account of the user, such as an account associated with a credit card, debit card, and/or the like. The second transaction may be for the value of the benefit and may be conducted with a second account. In non-limiting embodiments, the second account corresponds to a benefit account of the merchant. In other non-limiting embodiments, the benefit account may be an account of a third-party. Initiating the first transaction with the first account may include, as an example, communicating a payment request for the adjusted total transaction value to a payment processing system. Initiating the second transaction may include, as an example, allocating the value of the benefit from the benefit account to a primary merchant account. This may appear to the user as a single transaction with the first account or as two transactions, one with the first account and the other with a benefit account maintained by the merchant or a third-party. The combined total of the user transaction and the merchant transaction may be equal to the total transaction value. In non-limiting embodiments, when multiple payment methods or payment accounts are used by the user, a separate transaction may be initiated for each user payment method or account. The total value of the user's payment transactions may be equal to the adjusted transaction value.

Figure 3:
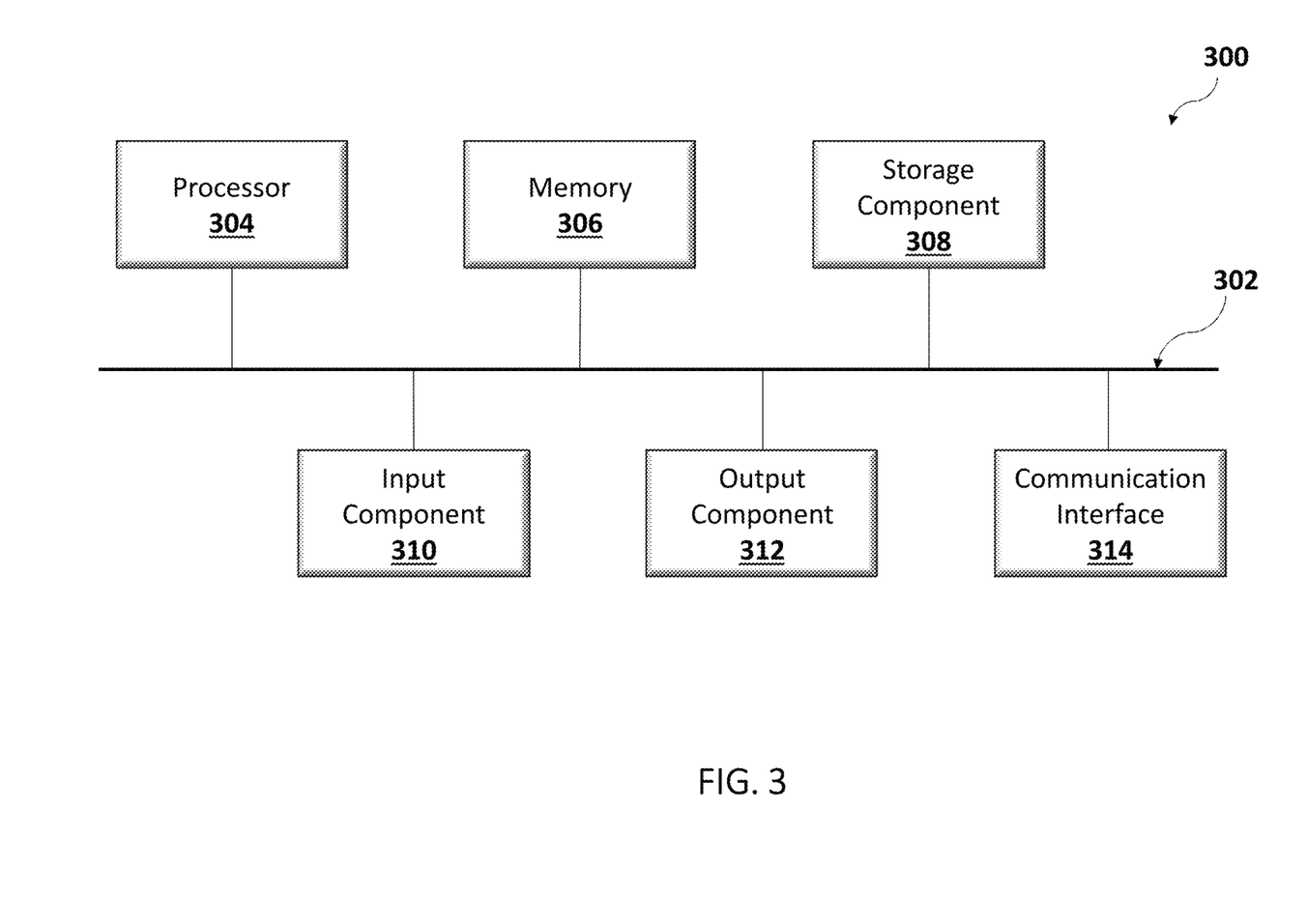
FIG. 3 is a diagram of a non-limiting embodiment of components of one or more devices of FIG. 1.

Referring now to FIG. 3, shown is a diagram of example components of a device 300 according to non-limiting embodiments. Device 300 may correspond to e-commerce server 102, customer device 108, and/or data storage device 104 in FIG. 1. In some non-limiting embodiments, e-commerce server 102, customer device 108, and/or data storage device 104 may include at least one device 300 and/or at least one component of device 300. As shown in FIG. 3, device 300 may include a bus 302, a processor 304, memory 306, a storage component 308, an input component 310, an output component 312, and a communication interface 314.

Bus 302 may include a component that permits communication among the components of device 300. In some non-limiting embodiments, processor 304 may be implemented in hardware, firmware, or a combination of hardware and software. For example, processor 304 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 306 may include random access memory (RAM), read only memory (ROM), and/or another type of dynamic or static storage device (e.g., flash memory, magnetic memory, optical memory, etc.) that stores information and/or instructions for use by processor 304.

Storage component 308 may store information and/or software related to the operation and use of device 300. For example, storage component 308 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 310 may include a component that permits device 300 to receive information, such as via user input (e.g., a touch screen display, a keyboard, a keypad, a mouse, a button, a switch, a microphone, etc.). Additionally or alternatively, input component 310 may include a sensor for sensing information (e.g., a global positioning system (GPS) component, an accelerometer, a gyroscope, an actuator, etc.). Output component 312 may include a component that provides output information from device 300 (e.g., a display, a speaker, one or more light-emitting diodes (LEDs), etc.).

Communication interface 314 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 314 may permit device 300 to receive information from another device and/or provide information to another device. For example, communication interface 314 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 300 may perform one or more processes described herein. Device 300 may perform these processes based on processor 304 executing software instructions stored by a computer-readable medium, such as memory 306 and/or storage component 308. A computer-readable medium (e.g., a non-transitory computer-readable medium) is defined herein as a non-transitory memory device. A memory device includes memory space located inside of a single physical storage device or memory space spread across multiple physical storage devices.

Software instructions may be read into memory 306 and/or storage component 308 from another computer-readable medium or from another device via communication interface 314. When executed, software instructions stored in memory 306 and/or storage component 308 may cause processor 304 to perform one or more processes described herein. Additionally or alternatively, hardwired circuitry may be used in place of or in combination with software instructions to perform one or more processes described herein. Thus, embodiments described herein are not limited to any specific combination of hardware circuitry and software.

The number and arrangement of components shown in FIG. 3 are provided as an example. In some non-limiting embodiments, device 300 may include additional components, fewer components, different components, or differently arranged components than those shown in FIG. 3. Additionally or alternatively, a set of components (e.g., one or more components) of device 300 may perform one or more functions described as being performed by another set of components of device 300.

Figure 4:
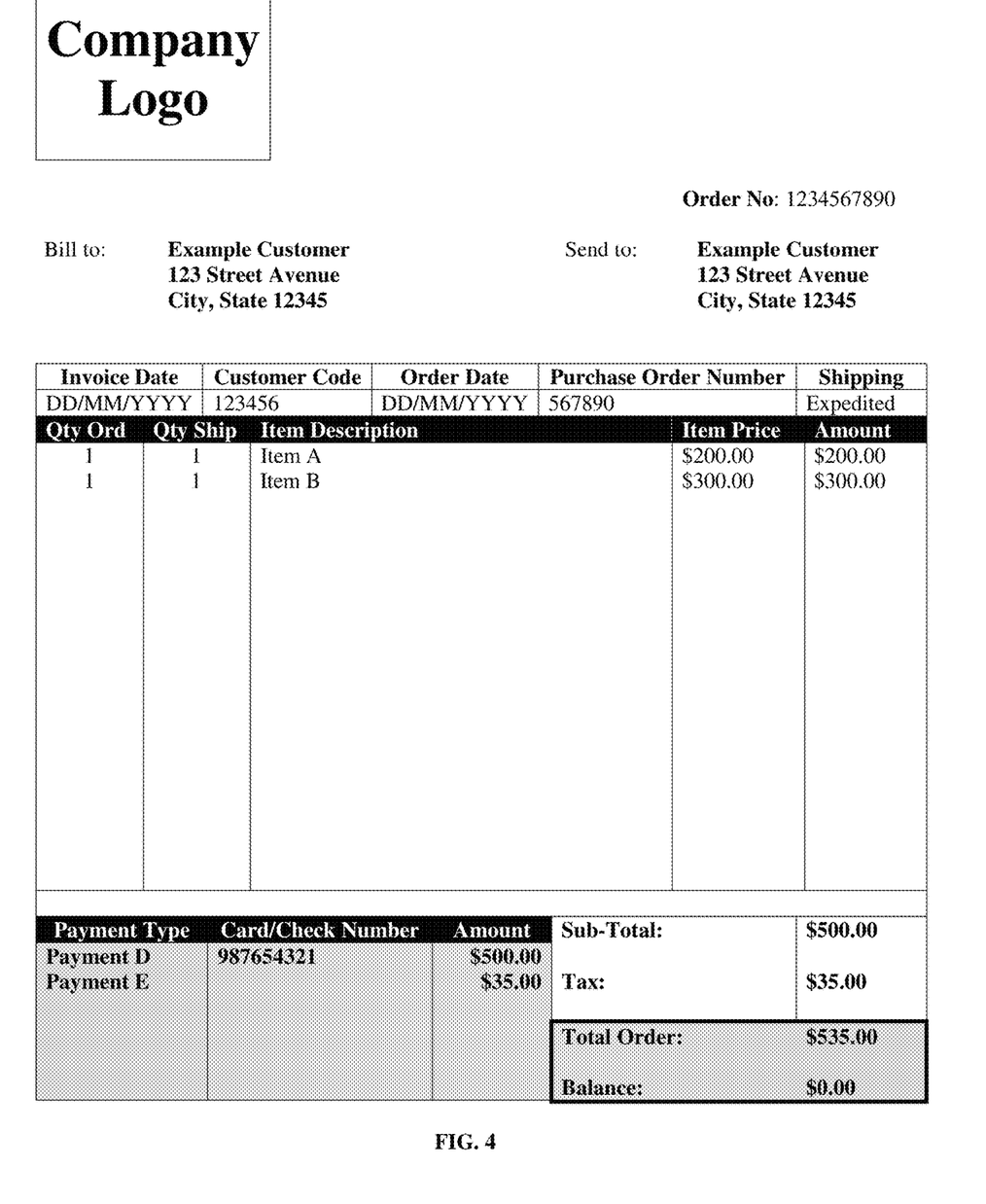
FIG. 4 is an example invoice in which all payment methods are eligible for a benefit.

In reference to FIG. 4, shown is a non-limiting embodiment of an invoice for an e-commerce transaction with a benefit applied. The request for purchase includes Item A and Item B, for a total purchase price of $500. The delivery destination is the "Send to" address. The purchase price is $500 and a state tax rate of 7% for the delivery destination results in a state tax of $35. This results in a total transaction value of $535. If the user, payment method, and purchase are eligible for a benefit, the benefit would be $35, which is the total state tax amount for the purchase. The total transaction value of $535 would be decreased by the benefit of $35, resulting in an adjusted transaction value of $500.

In continued reference to FIG. 4, two different payment accounts are utilized to make the payment on the purchase. "Payment D" represents a payment account of the user. A transaction with Payment D is initiated for $500, which is the adjusted transaction value. "Payment E" represents the account corresponding to a benefit account for the merchant. A transaction with Payment E is initiated for the total benefit amount of $35.

Figure 5:
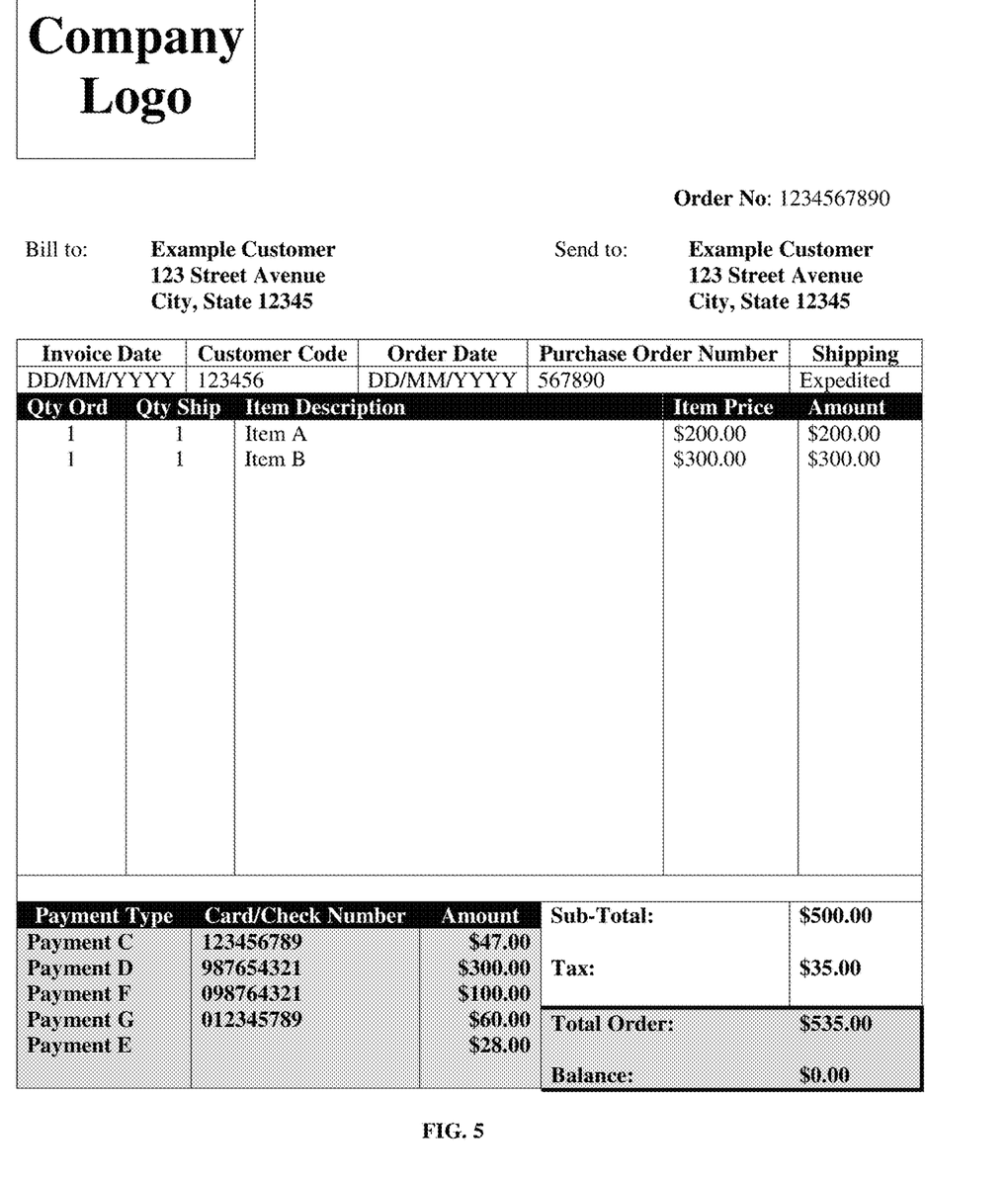
FIG. 5 is an example invoice in which not all payment methods are eligible for a benefit.

Referring to FIG. 5, shown is a non-limiting example invoice with a benefit when at least one payment method is not eligible for the benefit. In this example, the purchase price of the order is $500 and the state tax of the order is $35, resulting in a total transaction value of $535. Payment C and Payment G are payment methods that are not eligible for the benefit. Payment D and Payment F are payment methods that are eligible for the benefit. The benefit is calculated based on the amount of the purchase price that is paid using the eligible payment methods, Payment D and Payment F, which totals $400. A total benefit of $28 is calculated based on the amount of the purchase price being paid by an eligible payment method, and the adjusted transaction value is $507. The benefit of $28 is paid by the merchant benefit account through a transaction with Payment E. The transactions for the eligible payment methods (Payment D and Payment F) are used to pay $400 of the adjusted transaction value. Transactions for the ineligible payment methods (Payment C and Payment G) are used to pay the remainder of the adjusted transaction value ($107). The total amount of the e-commerce transaction across all transactions, including the merchant benefit account, is then $535. It will be appreciated that the invoices shown in FIGS. 4 and 5 are for example purposes only and that a variety of different formats may be used.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A computer-implemented method for location-based benefits for e-commerce transactions, comprising:
receiving a request for a purchase with a delivery destination from a user;
determining, with at least one processor, a geophysical location of the delivery destination based on the request;
determining, with at least one processor, a total transaction value based on a purchase price and an amount of state taxes corresponding to the purchase based on the geophysical location of the delivery destination;
determining, with at least one processor, a benefit based on an amount of state taxes corresponding to the purchase;
adjusting, with at least one processor, the total transaction value by decreasing the total transaction value by the benefit, resulting in an adjusted total transaction value; and
initiating an e-commerce transaction for the purchase based on the adjusted total transaction value by initiating two separate transactions that appear as a single transaction to the user in response to the request for the purchase, the two separate transactions comprising a first transaction and a second transaction, the first transaction comprising a user transaction, the second transaction comprising a merchant transaction, wherein initiating the two separate transactions comprises:
initiating the first transaction for the adjusted total transaction value with a first account by communicating a payment request for the adjusted total transaction value to a payment processing system, wherein the first account comprises an account of the user; and
initiating the second transaction for a value of the benefit with a second account by allocating the value of the benefit from the second account to a primary merchant account of a merchant, wherein the second account comprises a benefit account of the merchant different than the first account and not associated with the user, wherein a combined total of the first transaction and the second transaction is equal to the total transaction value, and wherein the e-commerce transaction is completed without any additional transactions by the user.

2. The computer-implemented method of claim 1, wherein determining the benefit further comprises:
determining, with at least one processor, a benefit factor based on the geophysical location and a benefit database; and
generating the benefit by rounding the amount of state taxes up to the nearest multiple of the benefit factor.

3. The computer-implemented method of claim 2, wherein when the amount of state taxes is an exact multiple of the benefit factor, the benefit is generated by adding the benefit factor to the amount of state taxes.

4. The computer-implemented method of claim 3, wherein adding the benefit factor only occurs for purchases in which the geophysical location of the delivery destination is in certain pre-determined locations.

5. The computer-implemented method of claim 2, wherein the amount of state taxes is rounded down to the nearest multiple of the benefit factor.

6. The computer-implemented method of claim 1, wherein eligibility of the benefit is based on a payment method used to make the purchase.

7. The computer-implemented method of claim 1, wherein the geophysical location is determined based on a zip code used in a delivery address of the purchase.

8. A computer program product for location-based adjustment for e-commerce transactions, comprising at least one non-transitory computer-readable medium including program instructions that, when executed by at least one processor, cause the at least one processor to:
receive a request for a purchase with a delivery destination from a user;
determine a geophysical location of the delivery destination based on the request;
determine a total transaction value based on a purchase price and an amount of state taxes corresponding to the purchase based on the geophysical location of the delivery destination;

determine a benefit based on an amount of state taxes corresponding to the purchase, the amount of state taxes based on the geophysical location of the delivery destination;

adjust the total transaction value by decreasing the total transaction value by the benefit, resulting in an adjusted total transaction value; and initiate an e-commerce transaction for the purchase based on the adjusted total transaction value by initiating two separate transactions that appear as a single transaction to the user in response to the request for the purchase, the two separate transactions comprising a first transaction and a second transaction, the first transaction comprising a user transaction, the second transaction comprising a merchant transaction, wherein initiating the two separate transactions comprises:

initiating the first transaction for the adjusted total transaction value with a first account by communicating a payment request for the adjusted total transaction value to a payment processing system, wherein the first account comprises an account of the user; and initiating the second transaction for a value of the benefit with a second account by allocating the value of the benefit from the second account to a primary merchant account of a merchant, wherein the second account comprises a benefit account of the merchant different than the first account and not associated with the user, wherein a combined total of the first transaction and the second transaction is equal to the total transaction value, and wherein the e-commerce transaction is completed without any additional transactions by the user.

9. The computer program product of claim 8, wherein determining the benefit further comprises:

determining, with the at least one processor, a benefit factor based on the geophysical location and a benefit factor database; and generating the benefit by rounding the amount of state taxes up to the nearest multiple of the benefit factor.

10. The computer program product of claim 9, wherein when the amount of state taxes is an exact multiple of the benefit factor, the benefit is generated by adding the benefit factor to the amount of state taxes.

11. The computer program product of claim 10, wherein adding the benefit factor only occurs for purchases in which the geophysical location of the delivery destination is in certain pre-determined locations.

12. The computer program product of claim 9, wherein the amount of state taxes is rounded down to the nearest multiple of the benefit factor.

13. The computer program product of claim 8, wherein eligibility of the benefit is based on a payment method used to make the purchase.

14. The computer program product of claim 8, wherein the geophysical location is determined based on a zip code used in a delivery address of the purchase.

15. A system for location-based benefits for e-commerce transactions, comprising at least one computer including at least one processor programmed or configured to:

receive a request for a purchase with a delivery destination from a user;

determine a geophysical location of the delivery destination based on the request;

determine, with at least one processor, a total transaction value based on a purchase price and an amount of state taxes corresponding to the purchase based on the geophysical location of the delivery destination;

determine a benefit based on an amount of state taxes corresponding to the purchase, the amount of state taxes based on the geophysical location of the delivery destination;

adjust the total transaction value of the purchase by decreasing the total transaction value by the benefit, resulting in an adjusted total transaction value; and initiate an e-commerce transaction for the purchase based on the adjusted total transaction value by initiating two separate transactions that appear as a single transaction to the user in response to the request for the purchase, the two separate transactions comprising a first transaction and a second transaction, the first transaction comprising user transaction, the second transaction comprising a merchant transaction, wherein initiating the two separate transactions comprises:

initiating the first transaction for the adjusted total transaction value with a first account by communicating a payment request for the adjusted total transaction value to a payment processing system, wherein the first account comprises an account of the user; and initiating the second transaction for a value of the benefit with a second account by allocating the value of the benefit from the second account to a primary merchant account of a merchant, wherein the second account comprises a benefit account of the merchant different than the first account and not associate with the user, wherein a combined total of the first transaction and the second transaction is equal to the total transaction value, and wherein the e-commerce transaction is completed without any additional transactions by the user.

16. The computer-implemented method of claim 1, wherein determining the benefit is based on a benefit factor, and wherein the benefit factor is based on a payment method used to make the purchase.

17. The computer program product of claim 8, wherein determining the benefit is based on a benefit factor, and wherein the benefit factor is based on a payment method used to make the purchase.

18. The system of claim 15, wherein determining the benefit is based on a benefit factor, and wherein the benefit factor is based on a payment method used to make the purchase.

* * * * *

UNITED STATES PATENT AND TRADEMARK OFFICE
CERTIFICATE OF CORRECTION

PATENT NO. : 12,400,242 B1
APPLICATION NO. : 16/688070
DATED : August 26, 2025
INVENTOR(S) : Menashe Horowitz Page 1 of 1

It is certified that error appears in the above-identified patent and that said Letters Patent is hereby corrected as shown below:

In the Claims

Column 12, Line 25, Claim 15, delete "user" and insert -- a user --

Column 12, Line 39, Claim 15, delete "associate" and insert -- associated --

Signed and Sealed this
Twenty-fifth Day of November, 2025

John A. Squires
*Director of the United States Patent and Trademark Office*